United States Patent [19]

Ganiaris

[11] 4,036,619
[45] July 19, 1977

[54] FREEZER CONCENTRATION

[75] Inventor: Neophytos Ganiaris, Riverdale, N.Y.

[73] Assignee: Struthers Patent Corporation, Houston, Tex.

[21] Appl. No.: 560,447

[22] Filed: Mar. 21, 1975

Related U.S. Application Data

[62] Division of Ser. No. 320,592, Jan. 2, 1973, abandoned.

[30] Foreign Application Priority Data

Jan. 5, 1972 United Kingdom .................. 364/72

[51] Int. Cl.² .......................... B01D 9/04; C02B 1/12
[52] U.S. Cl. ........................................ 62/123; 426/385
[58] Field of Search .......................... 62/123, 124, 58; 426/385

[56] References Cited

U.S. PATENT DOCUMENTS

| | | | |
|---|---|---|---|
| 3,050,953 | 8/1962 | Wilson, Jr. ........................ | 62/58 |
| 3,283,522 | 11/1966 | Ganiaris ........................... | 62/123 |
| 3,285,025 | 11/1966 | Shaul ................................ | 62/58 |
| 3,379,028 | 4/1968 | Dale ................................. | 62/58 |
| 3,614,874 | 10/1971 | Martindale et al. ............. | 62/123 |
| 3,616,653 | 11/1971 | Othmer ............................ | 62/58 |
| 3,662,562 | 5/1972 | Wiegandt ......................... | 62/58 |

FOREIGN PATENT DOCUMENTS

| | | | |
|---|---|---|---|
| 1,024,447 | 3/1966 | United Kingdom ............. | 62/58 |
| 1,240,842 | 7/1971 | United Kingdom ............. | 426/385 |

*Primary Examiner*—Ronald C. Capossela
*Attorney, Agent, or Firm*—William A. Drucker

[57] ABSTRACT

The invention concerns direct contact freeze concentration wherein a cooling medium is injected into aqueous solution to form ice slurry therein which is then centrifuged out to leave a concentrated aqueous solution. In particular citrus juice is concentrated and then freeze dried.

9 Claims, 3 Drawing Figures

FREEZER CONCENTRATION

This is a division of application Ser. No. 320,592, filed Jan. 2, 1973 now abandoned.

This invention relates to the freeze concentration of comestible liquids e.g. coffee, tea and orange juice.

It is known to treat the liquids in an indirect heat exchanger i.e. a heat exchanger in which the liquid is passed through a conduit which is cooled by a cooling fluid which is maintained out of contact with the liquid. Such a heat exchanger is commonly known as a crystalliser. Ice is formed in the liquid and the resultant slurry of ice and liquid is passed into a centrifuge which separates the ice from the concentrated liquid. The liquid may be further concentrated in a second crystalliser and centrifuge.

The object of the present invention is to effect a concentration more cheaply.

According to the invention a fluid cooling medium is injected into the liquid to be concentrated to form ice therein the cooling medium evaporating and being removed from the liquid, the ice is separated from the liquid and the liquid is further concentrated by indirect heat exchange and ice separation.

By this system a large part of the concentration is effected by the comparatively cheap method of direct injection of cooling medium e.g. butane or Freon while the final concentration is carried out in the more expensive indirect heat exchanger.

It is not practicable to carry out the whole of the concentration in a single or double system of direct contact cooling because of the high viscosity of the concentrated liquid. The high viscosity would cause a large carry over of cooling medium with the outgoing concentrated liquid and would militate against agitation of the liquid, and would reduce the rate of crystallization. In the primary stage of concentration by direct contact, it is desirable to maintain the ice crystal content of the slurry to 15 to 25 percent by weight, preferably 18 to 22% i.e. around 20%.

Thus in treating fresh orange juice of Brix value 10 to 12 (10 to 12 percent sugar content) the direct contact stage may be arranged to produce a concentrate of 20 to 40 Brix e.g. 30 to 32 Brix and the second stage indirect heat exchange may produce a liquor of 40 to 65 Brix.

The final product may, if desired, be frozen and freeze dried by subliming off the water at low temperature and pressure. This has the advantage of removing any traces of the direct cooling medium that may have been carried over in the liquid.

In applying the invention to coffee some difficulty arises due to production of foam but various methods can be used to overcome this problem.

The invention will be further described by way of example with reference to the accompanying diagrammatic drawings wherein.

Figure 1:
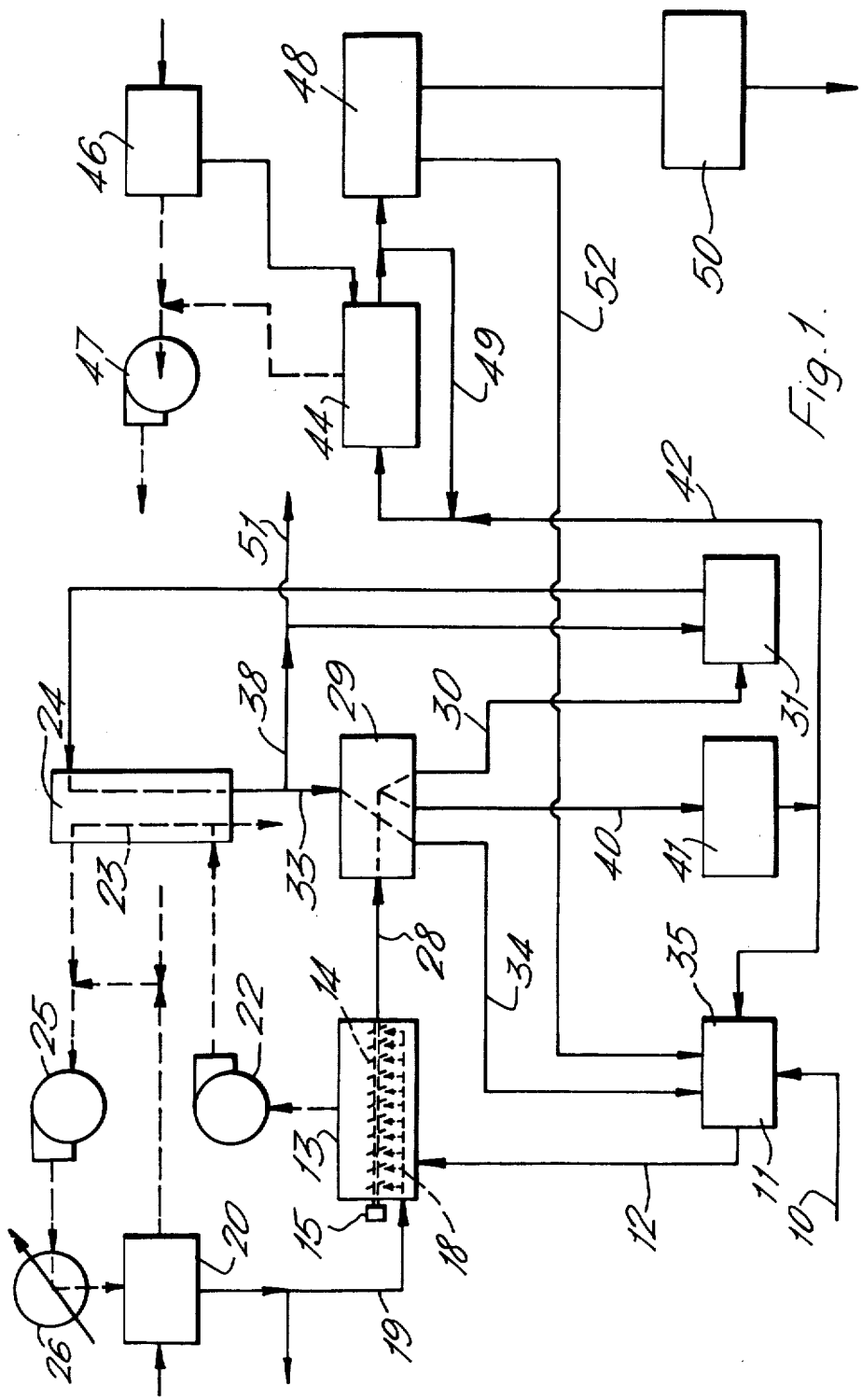
FIG. 1 is a flow diagram of a system made in accordance with the invention.

Liquid to be concentrated is fed by pipe 10 to a feed tank 11 and from thereby pipe 12 to a direct contact crystallizer 13 which has an agitating die rotor 14 driven by motor 15. A sparging pipe 18 is fed with liquid butane by pipe 19 from a flash tank 20. Butane leaves the crystallizer 13 and is compressed by main compressor 22 and fed to a direct contact condenser 24 where the refrigerant is condensed while the ice is melting. The butane then goes by auxiliary compressor 25 and is condensed in condenser 26 and fed back to the tank 20 as a liquid.

The slurry of ice and liquid from the crystallizer 13 is fed at 28 into a centrifuge 29. The ice from the centrifuge is fed by pipe 30 to a tank 31 from which it is pumped to the condenser 24. Some water from the condenser 24 goes by pipe 33 to the centrifuge for washing the ice and then by pipe 34 to a feed tank 35. Also some water from the condenser 24 goes by pipe 38 to the tank 31. The remaining water goes to waste or an evaporator for solids recovery via pipe 51. The mother liquor from the centrifuge 29 goes by pipe 40 to a tank 41 and thence a small part to feed tank 35 and the larger part by pipe 42 to an indirect heat exchanger or crystallizer 44. This crystallizer is cooled by butane from flash tank 46 and returned by compressor 47, auxiliary compressor 25 and condenser 26. The ice-liquid slurry from crystallizer 44 goes into a centrifuge 48 or some may be recycled at 49. The ice from 48 is recycled by pipe 52 to the feed tank 35. The liquor from 48 goes to the product tank 50.

Froth or foam produced in the injection step i.e. in the crystallizer 13 may be reduced by cooling it.

Figure 2:
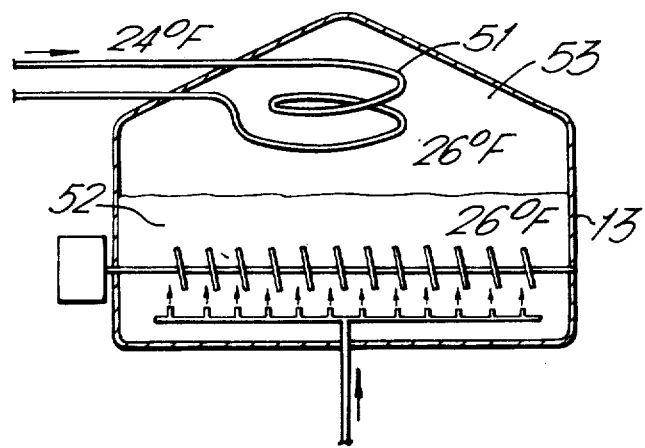
FIGS. 2 and 3 illustrate two methods of dealing with foam.

FIG. 2 shows a method of dealing with froth in the crystallizer 13 viz. by providing a heat exchanger tube 51 in the upper part, of the crystallizer. The tube 51 is maintained at a temperature a few degrees below that of the liquid and foam e.g. if the liquid 52 and foam at 53 is at 26° F the tube 51 may be at 22°-24° F.

Figure 3:
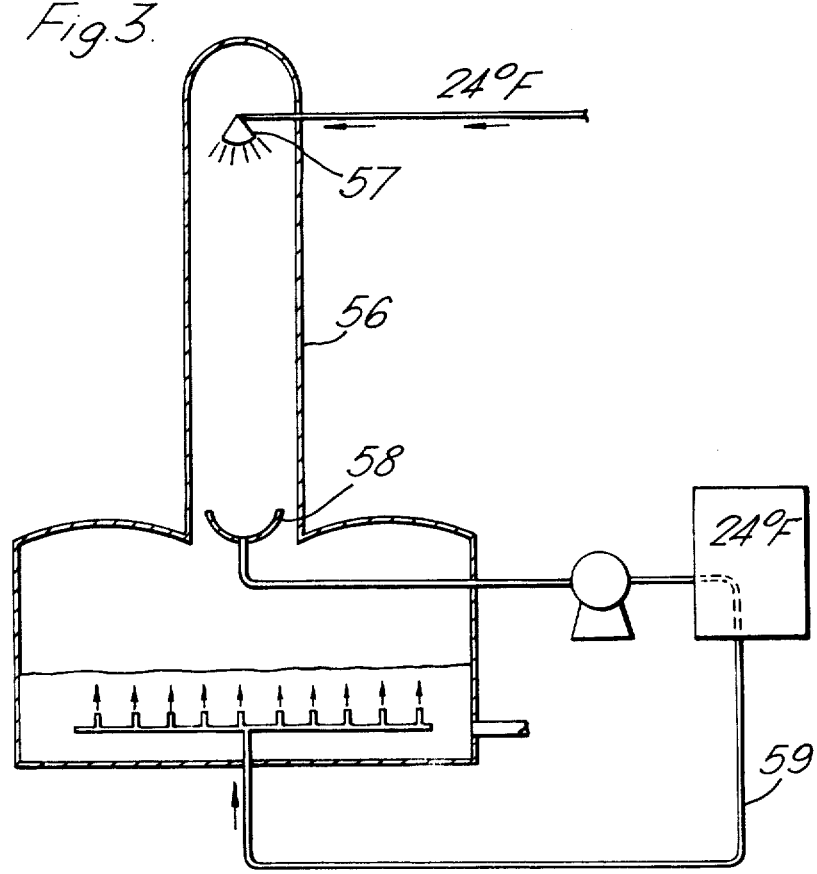

FIG. 3 shows another way to achieve a similar result. The foam ascends into a tower 56 and is sprayed with butane by spray nozzle 57 at a temperature below that of the butane foam in 56. The butane from the foam is collected by a collector 58 and may be returned to the chamber 26 or by pipe 59 into the sparge pipe 18.

I claim:

1. An apparatus for freeze concentration of a comestible liquid comprising a direct contact crystallizer, an indirect contact crystallizer, means for feeding the comestible liquid to the direct contact crystallizer whereby a slurry of ice and liquid is formed therein, means for feeding said liquid from the direct contact crystallizer to the indirect contact crystallizer whereby an ice-liquid slurry is formed therein, means to inject a cooling medium into the liquid when said comestible liquid is in the direct contact crystallizer to form said slurry of ice and liquid therein, and means for supplying a cooling medium to the indirect contact crystallizer for cooling said liquid in the indirect contact crystallizer to form said ice-liquid slurry therein.

2. An apparatus as claimed in claim 1 having a first centrifuge for separating said ice from said liquid from said direct contact crystallizer and a second centrifuge for separating said ice from said liquid from said indirect contact crystallizer.

3. An apparatus for freeze concentration of a liquid comprising a direct contact crystallizer, an indirect contact crystallizer, means for feeding the liquid to the direct contact crystallizer and thereafter to the indirect contact crystallizer, means to inject a cooling medium into the liquid in the direct contact crystallizer, means for supplying a cooling medium to the indirect contact crystallizer, a first centrifuge for separating ice from liquid from the first crystallizer, a second centrifuge for separating ice from liquid from the second crystallizer, a feed tank, means to feed the liquid to said tank, and means to feed at least one of ice-washing water from the first centrifuge, and mother liquor from the first centrifuge to said feed tank.

4. An apparatus as claimed in claim 3 having an ice melting tank, means to feed the evaporated medium to said tank and means to feed ice to said tank into direct contact with said medium and means to recondense the medium from said tank.

5. An apparatus as claimed in claim 4 having means for feeding ice from the first centrifuge to said tank.

6. An apparatus as claimed in claim 5 having an ice holding tank, means for feeding water from the ice melting tank partly to the first centrifuge, and partly to said ice holding tank, and means for feeding ice from the first centrifuge to the ice holding tank.

7. An apparatus as claimed in claim 6 wherein the same cooling medium is used for the first and second crystallizers and having means for recondensing the evaporated medium from both crystallizers.

8. An apparatus as claimed in claim 7 wherein the first crystallizer has a cooling device in the upper part thereof.

9. An apparatus as claimed in claim 7 wherein the first crystallizer has means for spraying cooling medium on to the froth on the liquid therein.

* * * * *